US007228222B2

(12) United States Patent
Ono

(10) Patent No.: US 7,228,222 B2
(45) Date of Patent: Jun. 5, 2007

(54) ENGINE START CONTROL DEVICE AND START CONTROL METHOD

(75) Inventor: Masato Ono, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/551,446

(22) PCT Filed: Apr. 2, 2004

(86) PCT No.: PCT/JP2004/004858

§ 371 (c)(1),
(2), (4) Date: Sep. 29, 2005

(87) PCT Pub. No.: WO2004/090317

PCT Pub. Date: Oct. 21, 2004

(65) Prior Publication Data

US 2006/0247841 A1 Nov. 2, 2006

(30) Foreign Application Priority Data

Apr. 3, 2003 (JP) ............................ 2003-100334

(51) Int. Cl.
*G06F 19/00* (2006.01)
*F01M 1/16* (2006.01)
*F02N 17/00* (2006.01)

(52) U.S. Cl. ................ 701/113; 123/179.1; 123/185.1; 701/114

(58) Field of Classification Search .. 123/179.3–179.5, 123/179.16, 185.1–185.3, 486, 491, 179.1; 701/112–115
See application file for complete search history.

(56) References Cited

U.S. PATENT DOCUMENTS

| | | | | |
|---|---|---|---|---|
| 4,444,168 A | | 4/1984 | Matsumura et al. | |
| 4,683,859 A | * | 8/1987 | Tamura et al. | 123/491 |
| 5,419,291 A | * | 5/1995 | Kimata et al. | 123/179.16 |

FOREIGN PATENT DOCUMENTS

| | | | | |
|---|---|---|---|---|
| DE | 19717631 A1 | * | 11/1998 | 123/179.16 |
| JP | 57-126534 | | 8/1982 | |
| JP | 07042609 A | * | 2/1995 | 701/113 |
| JP | 8-189402 | | 7/1996 | |
| JP | 9-256887 | | 9/1997 | |
| JP | 10083355 A | * | 3/1998 | 123/179.1 |
| JP | 2002-106397 | | 4/2002 | |

OTHER PUBLICATIONS

Copy of Japanese Office Action mailed Dec. 5, 2006, with English translation.

* cited by examiner

*Primary Examiner*—Willis R. Wolfe, Jr.
(74) *Attorney, Agent, or Firm*—Squire, Sanders & Dempsey L.L.P.

(57) ABSTRACT

An engine start control device which in a time period from the start of a starting operation by a starter for starting an engine to the start of the engine, reads out substitute values used at the time of starting the engine, instead of reading out backup data used for normal operation control of the engine, and after starting of the engine, reads out the backup data instead of the substitute values.

3 Claims, 3 Drawing Sheets

ENGINE START CONTROL DEVICE AND START CONTROL METHOD

TECHNICAL FIELD

The present invention relates to an engine start control device and a start control method.

The basic application of the present application is Japanese Patent Application No. 2003-100334, the contents of which are incorporated herein by reference.

BACKGROUND ART

Among start control devices for engines such as outboard motors, for example, there is a type that simultaneously performs a memory check and reads backup data, at the time of the initial engine start processing.

This will be described using FIG. 3. Firstly, after an engine is started by a recoil starter, an SRF setting step, in which the input-output terminal of an ECU is set, is performed in step S1, then in step S2 a ROM (Read Only Memory) health check and a RAM (Random Access Memory) health check are performed, and afterwards, in step S3, backup data and the like, to be used for engine operation control, are,read out from an EEP-ROM (Electronically Erasable and Programmable Read Only Memory), and in step S4, the flow proceeds to an engine control mode.

Incidentally, due to recent exhaust gas regulatory policies, engines that are provided with a fuel injection device have been used. However, in an engine in which a fuel injection device is incorporated, firstly the engine start operation is performed, then initial processing similar to that stated above is performed, and afterwards the fuel injection is started to start the engine (for example, refer to Japanese Unexamined Patent Application, First Publication No. H09-256887).

However, in the above-described conventional engine start control device, since time is required for the ROM check, RAM check, and readout of backup data and the like from the EEP-ROM, there is a problem in that the engine control start is delayed. Even with such a delay, in the case where the engine, being the object, is furnished with a battery such that power can be supplied to the ignition system without interruption, there is no problem. However, in the case where the engine, being the object, is an outboard motor provided with a recoil starter, or an engine provided with a kick starter, and it is also a battery-less system, there is a problem in that the engine cannot start if no power is supplied to the ignition system while pulling the rope of the recoil starter, or while giving a kick.

That is, it takes time for the health check of each of the memories, and readout of backup data. Therefore, if cranking has already been completed at the point in time for ignition, generated power cannot be obtained, and thus the engine cannot start. Furthermore, even in the case where a battery is provided, a similar problem occurs when the battery capacity is low.

Especially, in the aforementioned engine incorporating a fuel injection device, since fuel is supplied from the fuel pump to the injector, and fuel injection is performed by driving the injector, more power is required to start the engine. Hence, the above-described problem is serious.

Therefore, the present invention has an object of providing an engine start control device and a start control method, by which startability is improved, and control can shift to an engine control mode in a short time.

DISCLOSURE OF INVENTION

In order to solve the above-described problems, the present invention employs the following means.

That is, an engine start control device of the present invention, in a time period from the start of a starting operation by a starter for starting an engine to the start of the engine, uses substitute values used at the time of starting the engine, instead of backup data used for operation control of the engine. After starting of the engine, a health check of a memory section used for the operation control, and readout of the backup data instead of the substitute values are performed.

According to this construction, the engine is started by power generated at the time of cranking immediately after the start operation. Then the health check of the memory section, and readout of the backup data are performed, and control shifts to engine control mode. As a result, it is possible to start the engine reliably and in a short time.

An engine start control device of the present invention includes: an engine start determination device which determines whether an engine is started or not; a substitute value setting device which in the case where it is determined by the engine start determination device that the engine is stopped, sets substitute values used at the time of starting the engine, instead of reading out backup data used for operation control of the engine; and a memory section checking device which in the case where it is determined by the engine start determination device that the engine is started, performs a health check of a memory section used for the operation control.

According to this construction, in the case where it is determined by the engine start determination device that the engine is stopped, the engine is started using the substitute values set by the substitute value setting device, and in the case where it is determined by the engine start determination device that the engine is started, the memory section is checked by the memory section checking device. Therefore, since checking of the memory section is performed after the engine is started, it is possible to start the engine reliably and in a short time.

An engine start control method of the present invention includes: a first step for, after start of a starting operation by a starter for starting an engine, reading substitute values used at the time of starting the engine, instead of backup data used for operation control of the engine; and a second step for, in the case where after the first step, start of the engine is detected, performing a health check of a memory section used for the operation control, and readout of the backup data instead of the substitute values.

According to this method, it is not necessary to perform a health check of the memory section and readout of the backup data after the starting operation by the starter. Furthermore, it is possible to start the engine promptly using the substitute values instead of the backup data. After the engine is started, a health check of the memory section is performed, and operation control of the engine using the backup data instead of the substitute values is performed. Accordingly, it is possible to start the engine reliably and in a short time.

BEST MODE FOR CARRYING OUT THE INVENTION

Hereunder is a description of an embodiment of an engine start control device and a start control method of the present invention, with reference to the figures.

Figure 1:
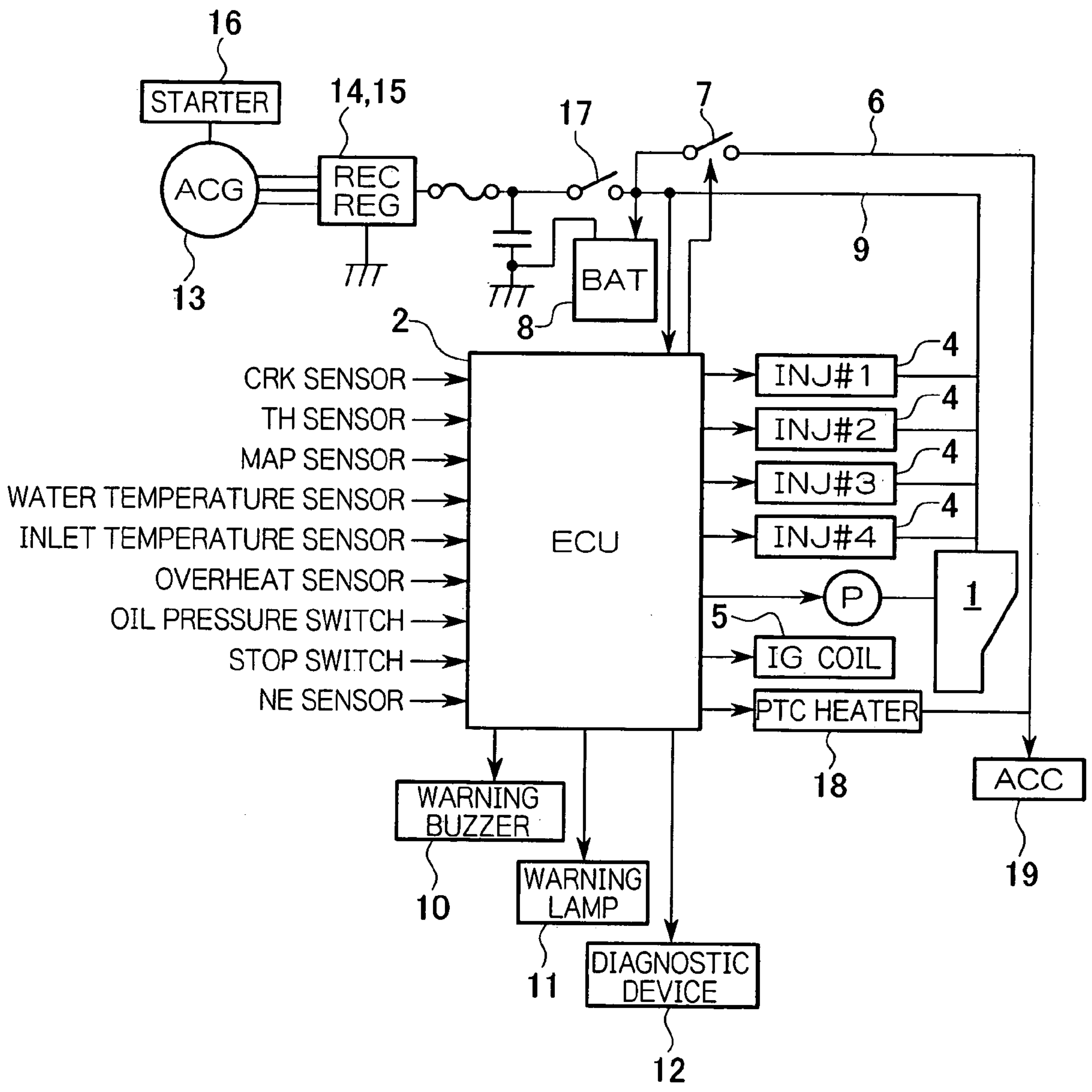
FIG. 1 is a system configuration diagram for an outboard motor which uses an embodiment of an engine start control device and a start control method of the present invention.

FIG. 1 is a system configuration diagram for an outboard motor according to the present embodiment. An engine (not shown in the figure) of an outboard motor 1, has a fuel pump (P) 3 which is driven via an ECU 2. Fuel supplied by the fuel pump 3 is injected by injectors (INJ #1 to 4) 4, ignited by energizing an ignition (IG) coil 5, and burned in the cylinders.

The ECU 2, as well as performing control of, the amount of fuel supplied to the injectors 4, the injection timing, and the ignition timing by the ignition coil 5, performs control of a PTC heater 18 for idle control, and open and close control of a relay 7 provided in an accessory circuit 6 for an accessory (ACC) 19 such as a lamp or the like. The ECU 2 includes: a CPU, being a central processing unit for performing a range of calculation processing; a RAM (memory section) for storing data partway through the calculations by the CPU; a ROM (memory section) for storing programs that the CPU executes, tables, maps and the like; and an EEP-ROM for storing backup data and the like. On receiving power supplied from a power circuit 9 connected to a battery 8, the ECU 2 starts operating.

To the ECU 2A is input signals from; a crank angle (CRK) sensor, a throttle opening (TH) sensor, a MAP sensor for detecting the inlet negative pressure of the engine, a water temperature sensor for detecting the temperature of engine cooling water, an inlet temperature sensor, an overheat sensor, an engine cooling oil pressure switch, a stop switch for emergency stop, and an engine speed (NE) sensor. Furthermore, as required, warnings are given by a warning buzzer 10 and a warning lamp 11, and reception and transmission of data to and from a fault diagnosis device 12 is performed.

Reference symbol 13 denotes an electrical generator (ACG). The electrical generator 13 generates electricity at the time of engine drive, and charges the battery (BAT) 8 of the power circuit 9 via a rectifier (REC) 14, and a regulator (REG) 15 for regulating the voltage. Moreover, the electrical generator 13 also generates electricity in the case of a starting operation by a manual recoil starter 16, and generates starting power for the ECU 2 when the battery capacity is low, which is described later, driving power to the fuel pump (P) 3, and the like. The recoil starter 16 indicates a starter which starts the engine by a starter rope being pulled. Reference symbol 17 denotes a main switch of the power circuit 9.

Figure 2:
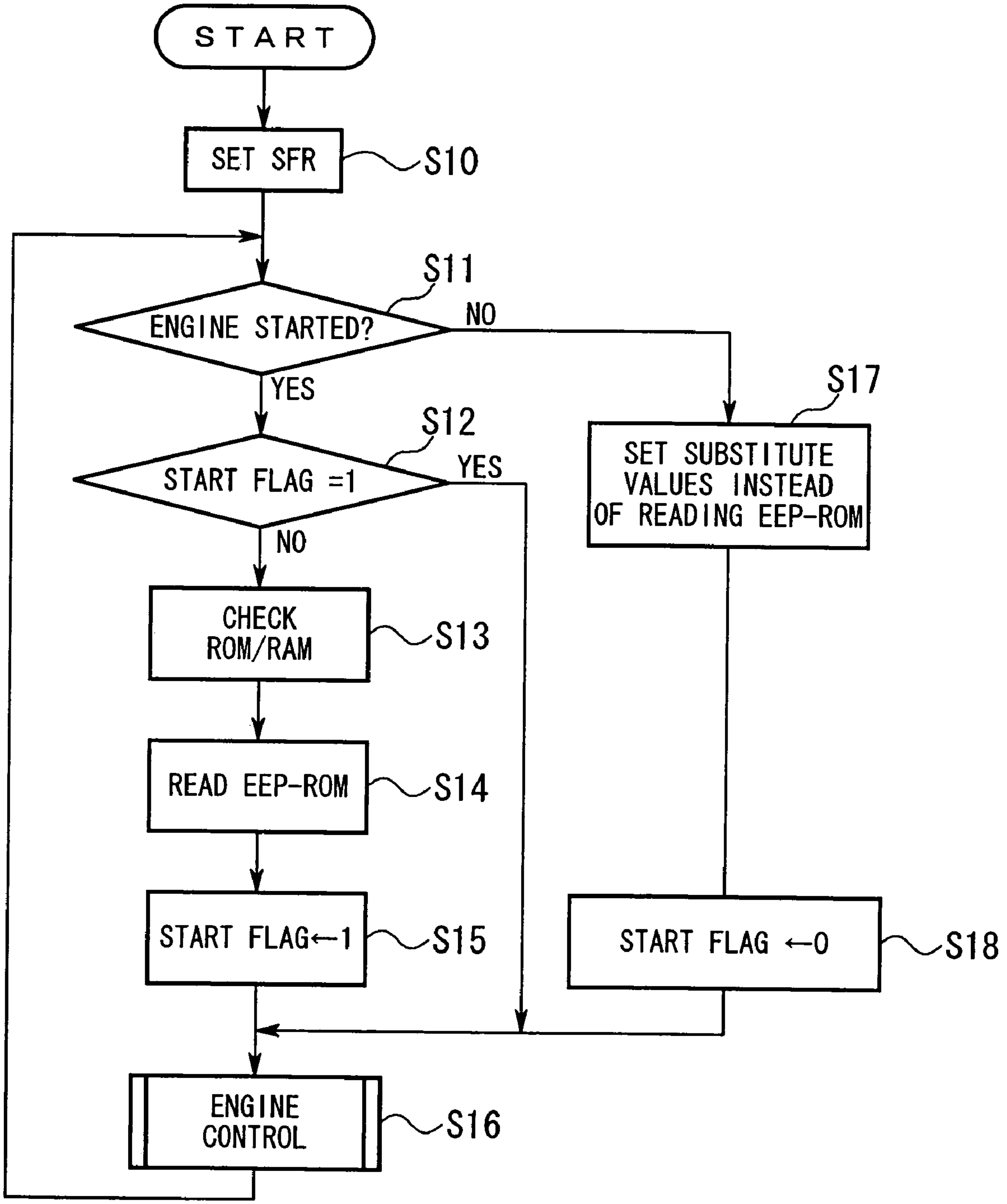
FIG. 2 is a flow chart showing the operation of the start control device.
Figure 3:
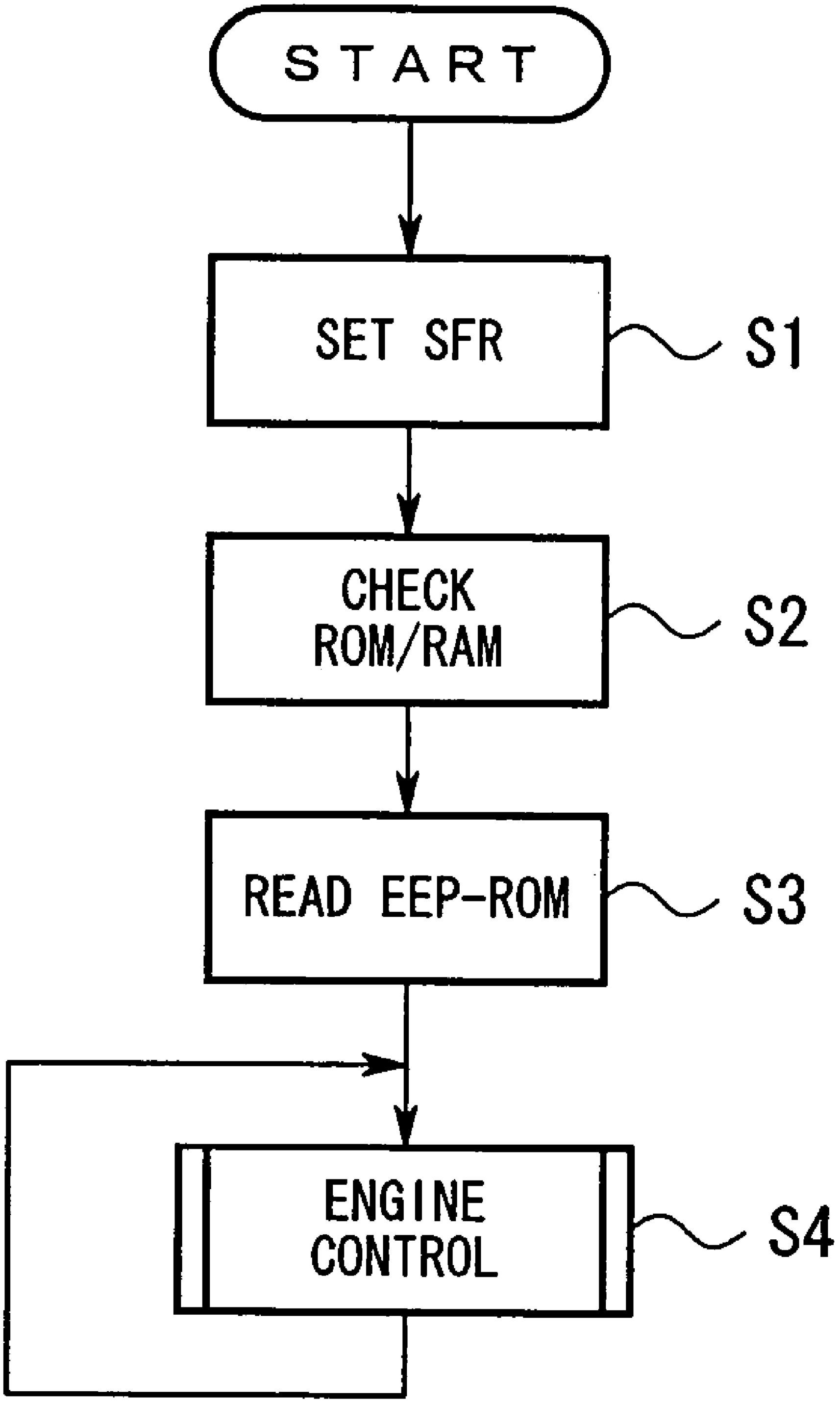
FIG. 3 is a flow chart showing the operation of a conventional engine start control device.

Next is a description of engine start control based on the flow chart of FIG. 2.

This flow chart shows the processing of the ECU 2 in the case where starting is performed using the recoil starter 16, in a situation where the battery residual capacity has dropped, or it is cold, so that the necessary voltage cannot be obtained from the battery 8 (when the battery capacity is low).

In FIG. 2, when a starting operation is performed by pulling the starter rope of the recoil starter 16, in step S10, SRF setting is performed to set up the input-output terminals of the ECU 2, and the like, and in step S11 (engine start determination means), it is determined whether the engine is started or not. This determination is performed based on information from an engine speed sensor. At the beginning, since the engine is not started, the determination result of step S11 is "NO". Therefore, in step S17 (substitute value setting means), backup data and the like are not read from the EEP-ROM, and substitute values (temporary values) are read (first step) instead, in order to reflect the engine control, which is described later. The substitute values are values necessary for starting the engine, and are a range of values determined in advance when the engine is not started, such as the fuel injection amount, crank angle when stopped, the throttle opening, the inlet negative pressure when started, and the like. In this processing, for example the values written into the ROM in advance are read out to the RAM for use. Then in step S18, a start flag is set to "0", in step S16 engine control is performed using a predetermined fuel injection amount, fuel injection timing, and the like, based on the substitute values, and the flow proceeds again to step S11. The start flag is a flag that is "1" when the engine is started, and "0" when the engine is not started.

When it is determined in step S11 that the engine is started (complete combustion), in step S12 it is determined whether the start flag value is "1" or not. However, since the engine was not started at the beginning, and the flag value is 0, the determination of step S12 is "NO", and flow proceeds to step S13 (memory section check means). In step 13, a ROM health check and RAM health check are performed for the first time. Then in step S14, backup data and the like are read from the EEP-ROM (second step) in order to reflect the engine control, and the flow proceeds to step S15. In step S15, the start flag is set to "1", and in the next step S16, engine control is performed using the backup data of step S14 instead of the substitute values set in step S17.

Then the flow again proceeds to step S11, and since the result in step S11 determines that the engine is started, the determination in the next step S12 is "YES". Therefore, engine control is continued in step S16.

Consequently, according to the present embodiment, it is possible to start the engine with the power generated by the electrical generator 13 at the time of cranking, immediately after the starting operation by the recoil starter 16, and then after the engine is started, to check the read only memory section (ROM) and the read-write memory section (RAM), and to read out the backup data from the backup memory section (EEP-ROM), and then to shift to engine control mode. Therefore, it is possible to start the engine reliably and in a short time.

That is, at the time of the starting operation of the recoil starter 16, the power generated by the electrical generator 13 during the short time of cranking is used preferentially to start the engine, and substitute values are used as initial data required to start the engine. Then after the engine is started and sufficient power can be assured from the electrical generator 13, a ROM check, a RAM check, readout of backup data from the EEP-ROM, and the like are performed.

Accordingly, this procedure is especially effective for an engine that consumes a large amount of power to drive the fuel pump 3, which supplies fuel to the injectors 4, and to drive the injectors to inject the fuel.

The present invention is not limited to the above-described embodiment. For example, in the present embodiment, an outboard motor 1 incorporating a recoil starter 16 is described as an example. However, the invention can also be used for a start control device of a three-wheel, or four-wheel, dune buggy incorporating a kick starter. Furthermore, the example is given of a case in which a battery 8 and a recoil starter 16 are used together. However, the invention can also be applied to a battery-less situation.

In the present embodiment, an engine start control device of the present invention is realized in which the procedures that are executed in the engine start control device are stored in a computer readable recording medium, and a program stored in this recording medium is read by a computer system for execution. The computer system mentioned here includes an OS (Operating System), and hardware such as peripheral equipment and the like.

Moreover, in the case where a WWW (World Wide Web) system is used, "computer system" also includes a website provider environment (or display environment).

Furthermore, "computer readable recording medium" means a portable medium such as a flexible disc, optical magnetic disc, ROM, CD-ROM, or the like, and memory storage such as a hard disc or the like, built into a computer system. Moreover, "computer readable recording medium" also includes a system where the program is transmitted via a network such as the Internet or the like, or a communication circuit such as a telephone line, or the like, and in which a program is stored temporarily in a volatile memory (RAM) in a computer system, being a client.

Furthermore, the above-described program may be transmitted from a computer system in which the program is stored in memory storage or the like to another computer system via a transmission medium, or by transmitted waves in the transmission medium. Here, a "transmission medium" that transmits the program means a medium having a function of transmitting information, such as a network (communication network) such as the Internet, or a communication circuit (communication line) such as a telephone line.

Moreover, the program may realize part of the aforementioned function. Furthermore, it may be a type that can be realized by a combination of the aforementioned function and a program already stored in a computer system, that is, a so-called differential file (differential program).

INDUSTRIAL APPLICABILITY

According to the engine start control device and start control method, it is possible to check the memory sections and read backup data, and shift to engine control mode, after an engine is started using the power generated at the time of cranking immediately after the starting operation by a starter. Therefore, it is possible to start the engine reliably and in a short time.

The invention claimed is:

1. An engine start control device which in a time period from the start of a starting operation by a starter for starting an engine to the start of the engine, uses substitute values used at the time of starting said engine, instead of backup data used for operation control of the engine, wherein after starting of the engine, a health check of a memory section used for the operation control, and readout of the backup data instead of the substitute values are performed.

2. An engine start control device comprising: an engine start determination device which determines whether an engine is started or not; a substitute value setting device which in the case where it is determined by the engine start determination device that the engine is stopped, sets substitute values used at the time of starting the engine, instead of reading out backup data used for operation control of the engine; and a memory section checking device which in the case where it is determined by the engine start determination device that the engine is started, performs a health check of a memory section used for the operation control.

3. An engine start control method comprising: a first step for, after start of a starting operation by a starter for starting an engine, reading substitute values used at the time of starting the engine, instead of backup data used for operation control of the engine; and a second step for, in the case where after the first step, start of the engine is detected, performing a health check of a memory section used for the operation control, and readout of the backup data instead of the substitute values.

* * * * *